United States Patent Office 3,458,538
Patented July 29, 1969

3,458,538
SEPARATION OF ANTHRACENE-PHENANTHRENE MIXTURES
Lee Robert Mahoney, Garden City, Mich., assignor to Ford Motor Company, Dearborn, Mich., a corporation of Delaware
No Drawing. Filed Jan. 23, 1964, Ser. No. 339,582
Int. Cl. C07c 49/68, 45/04, 7/02
U.S. Cl. 260—385                         6 Claims

ABSTRACT OF THE DISCLOSURE

A method is provided for separating an anthracene-phenanthrene mixture. The method comprises selectively oxidizing the anthracene in a liquid phase, low-temperature process in an inert solvent with molecular oxygen and an oxidation initiator and separating anthracene reaction product from the resulting mixture.

---

This invention relates to a method for separating an anthracene-phenanthrene mixture. In particular, this invention relates to a low-temperature method for selectively oxidizing anthracene in an anthracene-phenanthrene mixture and separating anthracene reaction products from the resulting mixture. More particularly, this invention relates to a liquid-phase, low-temperature method for producing anthaquinone by selectively oxidizing anthracene in an anthracene-phenanthrene mixture and converting at least a portion of the anthracene oxidation products to anthraquinone.

A variety of processes for oxidizing anthracene are disclosed or suggested in the literature. These include processes wherein the reaction is promoted with ozone e.g. Sturrock et al., U.S. Patent 2,898,350 and Culmer, U.S. Patent 1,430,538; vanadium pentoxide, e.g. Kaiseraugst, U.S. Patent 2,824,881; vanadic acid esters, e.g. Hill, U.S. Patent 2,220,041; oxides of nitrogen, e.g. Rewal, U.S. Patent 2,022,845 and Peters, U.S. Patent 1,455,488; an organic acid, a nitrogen-oxygen compound and a metal salt, e.g. Ullrich, U.S. Patent 1,467,258; irradiation, e.g. Kreidl, U.S. Patent 1,971,042; peroxide or peroxide-forming materials, e.g. Schneider et al., U.S. Patent 2,052,195 and Ullrich, U.S. Patent 1,466,683; etc.

While the conversion of pure anthracene to anthraquinone is a relatively simple operation, the anthracene containing feed-stocks available for quantitative production of anthraquinone ordinarily contain the isomeric phenanthrene and other polynuclear aromatics which are difficult to separate from anthracene by conventional separation techniques. For example, coal tar on distillation yields a fraction boiling between about 300° C. and about 360° C. which is commonly called "anthracene cake." The anthracene content of the crude cake varies from about 10 to about 35 percent. The cake usually contains roughly one-half as much carbazole as anthracene with the remainder being made up of phenanthrene, fluorenes and other oils and solids. In the past a number of procedures have been suggested for the separation of anthracene from anthracene cake. In one typical method, the cake is treated with caustic potash to remove carbazole and the residue is then fractionally recrystallized from pyridine and one or more suitable solvents. The multiplicity of steps required for effective separation in this and other methods heretofore employed have limited the production an anthraquinone from this source.

It is one object of this invention to provide an effective method for the preparation of anthraquinone from anthracene cake comprising selective oxidation of the anthracene fraction in an inert solvent, conversion of a resultant anthracene peroxide to anthraquinone, and recovery of anthraquinone from the inert solvent.

It is another object of this invention to provide a method for separating the anthracene fraction from anthracene cake containing anthracene, phenanthrene, and carbazole which comprises removing the carbazole fraction and selectively oxiding the anthracene of the residual fraction.

It is another object of this invention to provide a low-temperature, liquid-phase method for selectively oxidizing anthracene in an anthracene-phenanthrene mixture and converting the resulting anthracene oxidation products to the corresponding ketones.

These and other objects will become apparent from the following detailed description of this invention.

In accordance with the method of this invention liquid phase, selective oxidation of anthracene in the presence of phenanthrene is carried out in a suitably inert solvent at temperatures at which phenanthrene is essentially inert to oxidation under the conditions employed, i.e. below about 100° C., preferably below about 65° C. The oxidation is carried out with molecular oxygen and an initiator which decomposes at the temperature of reaction to form free radicals. Since no particular benefits are obtained by operating below room temperature the reaction ordinarily will be carried out at temperatures above about 20° C. The initiator employed is preferably one that decomposes at a substantially constant rate under the conditions of reaction. Suitable initiators include, but not by way of limitation, azobis-(2-methylpropionitrile) (50°–90° C.), 1, 1'-azocyanocyclohexane (70°–100° C.), 2, 2', 4, 4' tetraphenylbutane (40°–60° C.), etc. The initiator is advantageously employed in amounts in the range of about 1 mole of initiator to about 5 to 25 moles of anthracene in the mixture. The reaction can be carried out with smaller amounts of initiator and optimum concentrations will be somewhat dependent upon the choice of initiator, the temperature of reaction, etc.

Under the conditions of reaction the solvent used should be inert to oxidation as well as being one in which significant amounts of anthracene and reaction inducing amounts of initiator are soluble. Solvents which may be advantageously employed include paraffins, aromatic hydrocarbons which do not contain olefinic linkages or other oxidation sensitive functional groups, halogenated aromatics such as chlorobenzene, bromobenzene and dichlorobenzene, etc.

The molecular oxygen, i.e. the diatomic molecule $O_2$, may be introduced into the mixture in undiluted form or it may be diluted with a suitably inert gas or gases. An ordinary air stream is suitable for this purpose.

The selective oxidation of anthracene in accordance with this method is advantageously carried out at pressures above about 300 millimeters of mercury.

When anthracene was oxidized in accordance with the method of this invention, it was discovered that the rate of oxygen absorption by solutions of anthracene and initiator in a suitably inert solvent was directly proportional to the concentration of the anthracene in the solution and directly proportional to the square root of the concentration of the initiator. This rate was deterrmined at pressures of about 400 mm. at 60° C. and is applicable to those temperature-pressure combinations wherein the vapor pressure of the solvent does not significantly lower the partial pressure of oxygen. This rate of absorption is maintained until about 30 percent of the anthracene present has reacted. The rate of oxygen absorption then becomes somewhat slower. Surprisingly, it has also been observed that one mole of anthracene reacts for each mole of oxygen absorbed until at least 50 percent of the anthracene has been converted. Thus, a chain reaction is effected in which up to 25 or more moles of oxygen are absorbed for each mole of radicals produced by the initiator. This makes it possible to oxidize anthracene with oxygen gas at low pressures and low temperatures while using relatively small amounts of the initiator. The primary oxidation product is readily converted to anthraquinone by reducing the product with an aqueous solution of sodium hydroxide and sodium dithionate or other suitable reductant and exposing the resulting anthrahydroquinone to air.

Phenanthrene, pyrene, carbazole, and 1, 2-benzoanthracene do not undergo chain reactions with oxygen under the same conditions. Naphthacene undergoes a chain oxidation like anthracene under these conditions and at a much faster rate than anthracene. However, naphthacene is not ordinarily found in significant quantities in anthracene-rich mixtures of polynuclear aromatics which might serve as feedstocks for the preparation of anthraquinone.

Phenanthrene, even when present in high concentrations, e.g. three times the concentration of anthracene, does not inhibit the selective oxidation of the anthracene to any observable degree. Anthracene can be oxidized by this method in the presence of carbazole but the presence of carbazole tends to reduce the rate of reaction. Carbazole has a very low solubility in the solvents aforementioned and under ordinary conditions will not be present in the reaction solution in significant quantities.

The invention will be more fully understood from the following examples:

Example I

A solution of 0.4580 gram of anthracene (2.57 mmoles) and 0.105 gram of azobis-(2-methylpropionitrile) (0.635 mmole) dissolved in 10 ml. of chlorobenzene was vigorously stirred in an atmosphere of oxygen (400 mm. $O_2$ pressure) for 1000 minutes at 60° C. During this time, 0.378 mmole of radicals were produced as calculated from the rate of decomposition of the initiator and from the efficiency of production of the radicals. The solution was then stirred with a solution of 3 grams of sodium hydroxide and 3 grams of sodium dithionate in 100 ml. of water for 30 minutes. The dark red aqueous phase was removed and air was bubbled through it until it became colorless. During the air-blowing, a yellow solid separated. This yellow solid was extracted with benzene and the benzene was evaporated to give 0.142 gram (0.683 mmole) of anthraquinone with a melting point of 270–289° C. (subl.). The infrared spectrum and mass spectrum were identical to those of pure anthraquinone. The chlorobenzene layer, after the above dithionate treatment, yielded 0.343 gram of a solid which contained 83 percent anthracene (1.60 mmoles) as determined from mass spectral analysis.

Example II

A solution of 0.5580 gram of anthracene (3.13 mmoles), 1.0780 grams of phenanthrene (6.05 mmoles), 0.105 gram of azobis-(2-methylpropionitrile) dissolved in 9 ml. of chlorobenzene was stirred vigorously at 60° C. for 1000 minutes in an atmosphere of pure oxygen (745 mm. pressure). During this time, 0.378 mmole of radicals were produced. The chorobenzene solution was then treated with sodium hydroxide-sodium dithionate and extracted with benzene as described above. On evaporation of the benzene, 0.2687 gram of a yellow solid was recovered. Infrared analysis indicated that the material contained 69 percent of anthraquinone (0.185 gram or 0.917 mmole). A 0.150 gram portion of this material was recrystallized from ethyl alcohol to yield 0.074 gram of pure anthraquinone. The mother liquor yielded an additional 0.068 gram of material which contained 14 percent anthraquinone. Analysis revealed the second product to be the monoketone derivative of anthracene, anthrone.

Example III

A solution of 0.3856 gram anthracene (2.16 mmoles), 0.7441 gram phenanthrene (4.18 mmoles), 0.1499 gram 2, 2′, 4, 4′ tetraphenylbutane (0.416 mole) dissolved in 12 ml. of chlorobenzene was stirred vigorously at 40° C. for 1335 minutes in an atmosphere of pure oxygen (745 mm. pressure). During this time 0.430 mmole of radicals were produced. The chlorobenzene solution was then treated with sodium hydroxide-sodium dithionate and extracted with benzenes as described above. On evaporation of benzene, 0.2159 gram of a yellow solid was recovered. Infrared analysis indicated that the material contained 43 percent of anthraquinone (0.093 gram or 0.447 mmole).

The foregoing description and examples of this invention are not to be viewed as limiting since many variations may be made by those skilled in the art without departing from the spirit or the scope of the following claims.

I claim:

1. A method for separating an anthracene-phenanthrene mixture which comprises selectively oxidizing anthracene of said mixture in liquid phase at a temperature below about 100° C. with molecular oxygen in an inert solvent and in the presence of an oxidation initiator comprising an organic compound which decomposes at said temperature to form free radicals, and separating a resultant anthracene oxidation product from the resultant phenanthrene containing solution.

2. A method in accordance with claim 1 wherein said initiator is azobis-2(-methylpropionitrile).

3. A method in accordance with claim 1 wherein said initiator is 2,2′,4,4′-tetraphenylbutane.

4. A method in accordance with claim 1 wherein the mole ratio of said anthracene to said initiator is in the range of about 5–25 to 1.

5. A method for separating an anthracene-phenanthrene mixture which comprises in combination selectively oxidizing anthracene of said mixture by dispersing said mixture in an inert liquid solvent, maintaining said solvent in liquid phase and at a temperature in the range of about 20° C. to about 65° C., dispersing in said solvent a reaction inducing amount of an oxidation initiator comprising an organic compound that decomposes at said temperature to form free radicals, and introducing molecular oxygen into contact with said anthracene, said solvent being inert to oxidation at said temperature, and separating a resultant anthracene oxidation product from the resultant phenanthrene containing solution.

6. A method for separating an anthracene-phenanthrene mixture which comprises selectively oxidizing anthracene of said mixture in liquid phase at a temperature below about 100° C. with molecular oxygen in an inert solvent and in the presence of an oxidation initiator comprising an organic compound which decomposes at said temperature to form free radicals, introducing a reducing agent into the resultant solution and separating anthraquinone from the resultant phenanthrene containing solution.

References Cited

UNITED STATES PATENTS 1,308,168   6/1961   Conover.

OTHER REFERENCES

Mays et al. J. Am. Chem. Soc., vol. 80, pages 2500–2501 (1958).

LORRAINE A. WEINBERGER, Primary Examiner

H. C. WEGNER, Assistant Examiner

U.S. Cl. X.R.

260—396, 675